United States Patent [19]
Yamamoto et al.

[11] Patent Number: 4,982,622
[45] Date of Patent: Jan. 8, 1991

[54] HYDRAULIC PRESSURE CONTROL DEVICE FOR AUTOMATIC TRANSMISSION

[75] Inventors: Masanari Yamamoto; Mikio Iwase; Toshihiro Tomino, all of Anjo, Japan

[73] Assignee: Aisin Aw Co., Ltd., Japan

[21] Appl. No.: 377,428

[22] Filed: Jul. 10, 1989

[30] Foreign Application Priority Data

Jul. 12, 1988 [JP] Japan .................................. 63-173052
Aug. 10, 1988 [JP] Japan .................................. 63-199092

[51] Int. Cl.⁵ .............................................. B60K 41/18
[52] U.S. Cl. ........................................................ 74/866
[58] Field of Search ........................................... 74/866

[56] References Cited

U.S. PATENT DOCUMENTS

| | | | |
|---|---|---|---|
| 3,738,182 | 6/1973 | Kubo et al. | 74/866 |
| 3,738,199 | 6/1973 | Kubo et al. | 74/869 |
| 3,859,873 | 1/1975 | Miyauchi et al. | 74/867 |
| 4,222,292 | 9/1980 | Will et al. | 74/866 |
| 4,346,626 | 8/1982 | Kawamoto | 74/869 X |
| 4,367,528 | 1/1983 | Kawamoto et al. | 74/866 |
| 4,580,466 | 4/1986 | Iwanaga | 74/868 |
| 4,616,531 | 10/1986 | Ogasawara et al. | 74/866 |
| 4,631,982 | 12/1986 | Miki et al. | 74/866 X |
| 4,748,870 | 6/1988 | Sugino et al. | 74/866 |

*Primary Examiner*—Dirk Wright
*Attorney, Agent, or Firm*—Lorusso & Loud

[57] ABSTRACT

A pressure control device of an automatic transmission in which duty ratio of speed gear changing solenoid is controlled, when a shift is done from D, 2 or L range to P, R or N range and back again to D, 2 or L range, such that the duty ratio is maintained at 0% to ensure a sufficiently large apply flow rate and then increased followed by a progressive decrease towards 0%. The time over which the duty ratio is maintained at 0% is shortened in an amount which is determined in accordance with the time elapsed till the shift back to the D, 2 or L range, whereby an abrupt application of the engaging hydraulic pressure to a clutch is avoided to minimize a shock which is generated at the time of shifting. When a shift is done for the first time from N to D range after turning on of the ignition switch, the time over which the duty ratio is maintained at 0% is prolonged so as to increase the rate of supply of the hydraulic oil to oil passages and hydraulic pistons of clutches for operating rotational elements of the automatic transmission, so that sufficiently large quantity of oil is maintained at the time of the first shift from N to D range shortly after the start of the engine, thereby minimizing a shock.

4 Claims, 18 Drawing Sheets

FIG. 3

|  |  | SOLENOID | | | | CLUTCH | | BRAKE | | | O.W.D |
|---|---|---|---|---|---|---|---|---|---|---|---|
|  |  | C-1 | B-1 | C-0 | L-up | C-1 | C-2 | C-0 | B-1 | B-2 | F-1 |
| P |  | ○ | × | ○ | ※ | × | × | × | × | × | × |
| R |  | ○ | × | ○ | ※ | × | ○ | × | × | ○ | × |
| N |  | ○ | × | ○ | ※ | × | × | × | × | × | × |
| D (3) 2 | 1ST | × | × | ○ | ※ | ○ | × | × | × | × | ○ |
| | 2ND | × | ○ | ○ | ※ | ○ | × | × | ○ | × | × |
| | 3RD | × | ○ | × | ◎ | ○ | × | ○ | ● | × | × |
| | 4TH | ○ | ○ | × | ◎ | × | × | ○ | ○ | × | × |
| L | 1ST | × | × | ○ | ※ | ○ | × | × | × | ○ | ○ |
| | 2ND | × | ○ | ○ | ※ | ○ | × | × | ○ | × | × |

○ : SOLENOID ENERGIZE
◎ : SOLENOID ENERGIZE L-up ON
× : SOLENOID DE-ENERGIZE
○ : CLUTCH ENGAGE
● : B-1 RELEASED BY C-0 ENGAGING PRESSURE
× : CLUTCH DISENGAGE
※ SOLENOID ENERGIZED AT 0~7% THROTTLE OPENING
SOLENOID DE-ENERGIZED AT 7.0~100% THROTTLE OPENING

FIG. 5 (1ST Gear)

FIG. 6 (2nd Gear)

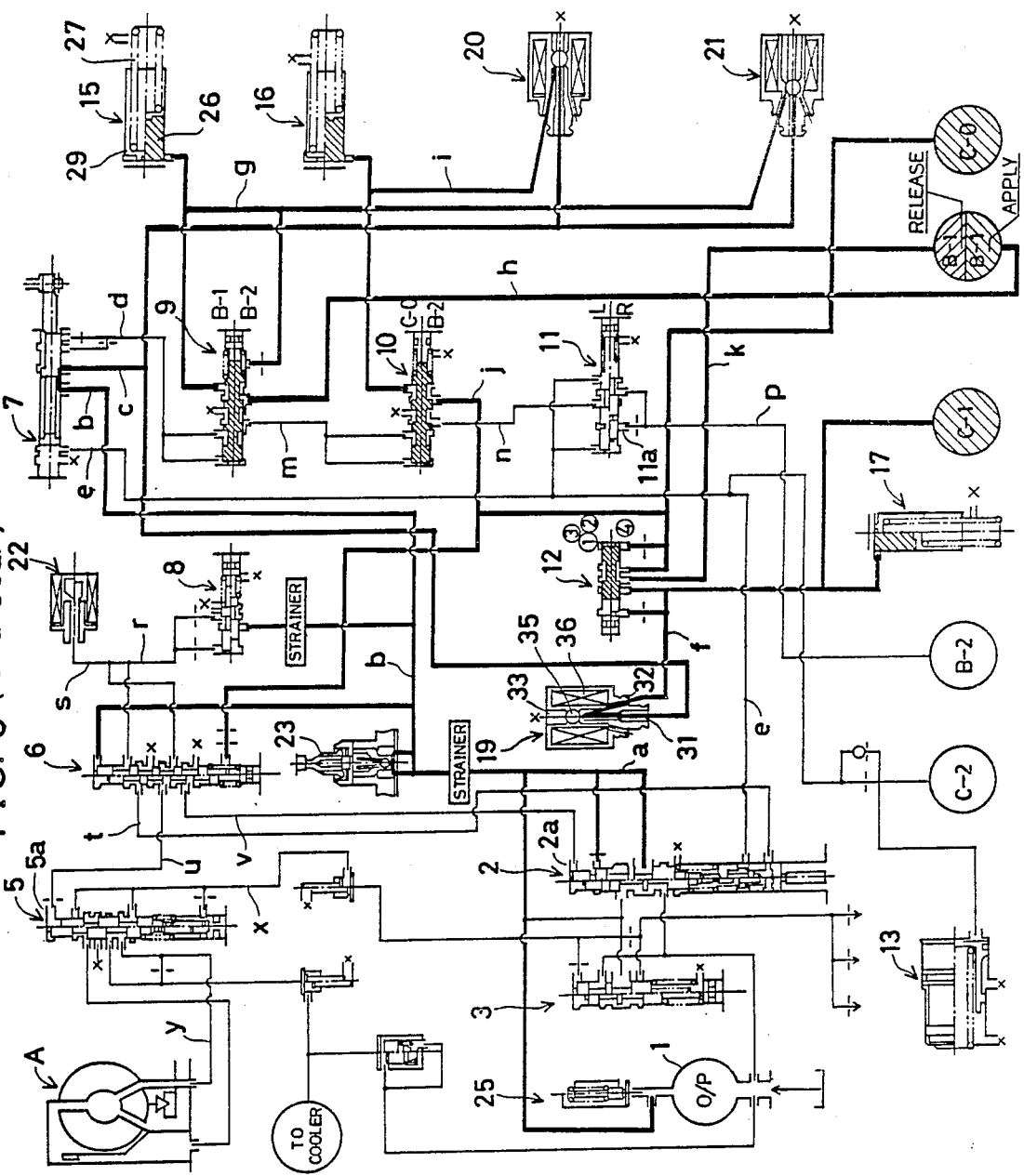
FIG. 8 (3rd Gear)

a, b, c, t and t' VARY ACCORDING TO THROTTLE OPENING

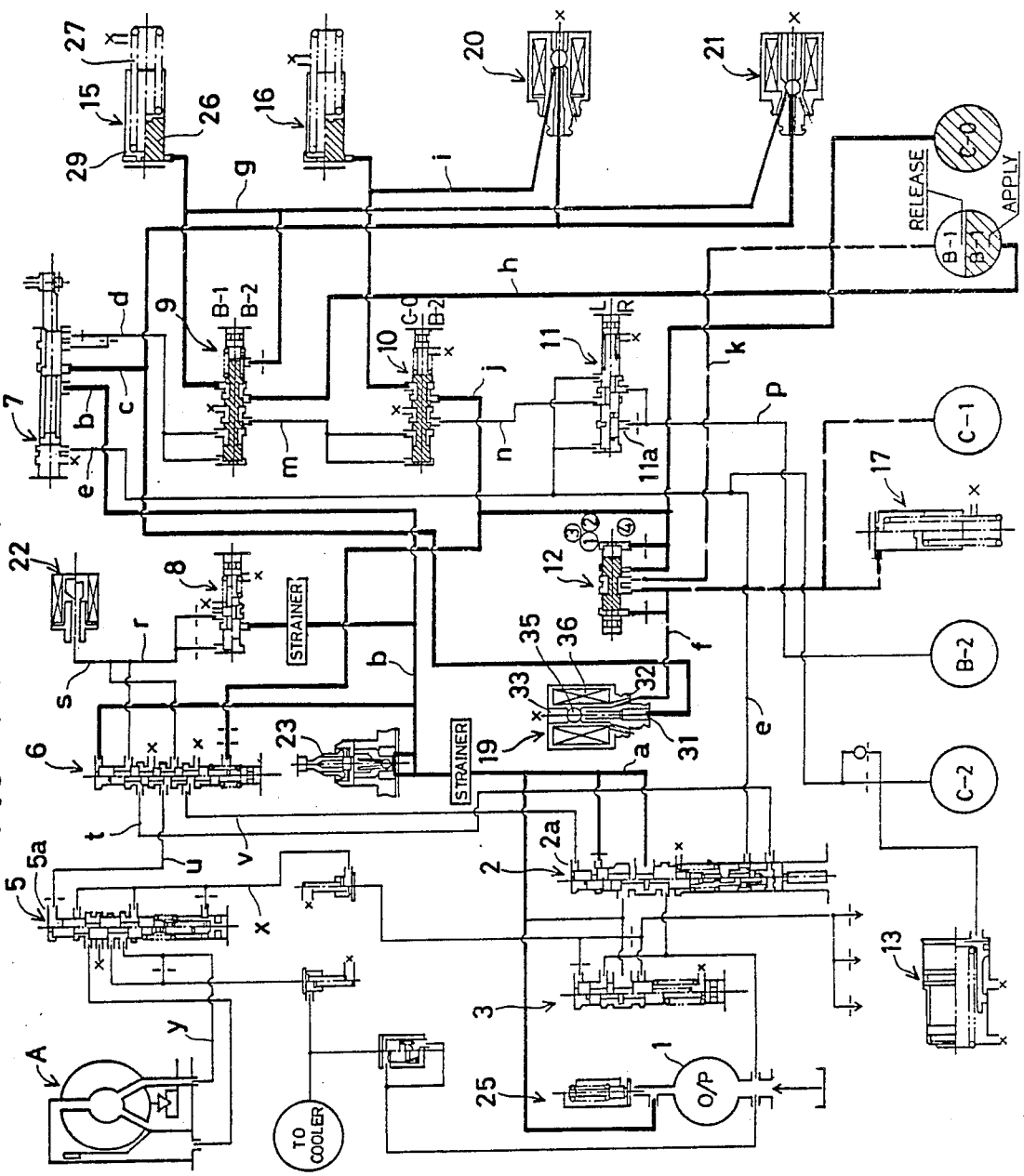
FIG.10 (4th Gear)

HYDRAULIC PRESSURE CONTROL DEVICE FOR AUTOMATIC TRANSMISSION

BACKGROUND OF THE INVENTION

The present invention relates to a hydraulic pressure control device for an automotive automatic transmission.

In general, an automotive automatic transmission is composed of a planetary gear mechanism and a plurality of frictional engagement elements including clutches and brakes. In operation, the states of engagements of the frictional engagement elements are changed in various patterns so as to selectively connect and disconnect rotary elements of the planetary gear mechanism or to lock a rotary element or elements against rotation, thereby obtaining a speed stage which is optimum for the instant running condition of the automobile.

The control of the frictional engagement elements is usually performed by a hydraulic circuit having, through suitably setting a manual valve connected through a link to a manually operable shift lever disposed in the compartment of the automobile. Supply and discharge to actuators of the frictional engagement elements are performed by a plurality of speed-changing shift valves such as 1-2 shift valve, 2-3 shift valve, 3-4 shift valve and so forth. More specifically, a vehicle velocity signal and a throttle opening signal representative of the instant state of the automobile are input to an electronic control circuit which compares these data with a previously stored speed gear changing pattern, and solenoid valves incorporated in the above-mentioned hydraulic circuit are operated in accordance with the result of the comparison so as to control the speed gear changing shift valves thereby to set the automatic transmission in a speed stage which is optimum for the instant state of running. The pressure characteristics of the actuators of the frictional engagement elements are set by means of accumulators.

In recent years, there is an increasing demand for development of automatic transmissions intended for use on miniaturized automobiles. Such automatic transmissions are required to be small in size and to have 3 or 4 speed stages. This demand is met to a certain degree by designing the mechanical parts such as gear trains to have reduced sizes but is not fully met because of difficulty in the reduction of size of the hydraulic control unit, since the size of the hydraulic control unit is directly relates to the number of speed stage rather than to the size of the gear trains.

More specifically, in the conventional automotive automatic transmission, the hydraulic control unit incorporate various components such as shift valves which are operated in accordance with throttle opening and vehicle speed, orifice valves for controlling the control line pressure, accumulators for setting engaging pressure characteristics of the actuators for the frictional engagement elements, and so forth. An increased number of speed stages requires increments in the numbers of the shift valves and accumulators, resulting in an increase in the size of the hydraulic control unit. In addition, the hydraulic circuit is complicated and the weight, volume and the cost of the same are also increased, thus failing to meet the demand for reduction in the size and cost of automatic transmissions. The setting of the engaging pressure characteristic of each accumulator is conducted by adjusting an orifice and a spring. This makes it difficult to effect a delicate shock control in response to all of various speed gear changing conditions such as a throttle opening, vehicle velocity and oil temperature. In addition, such an accumulator is difficult to tune in accordance with a variety of types of automatic transmissions.

Another problem encountered with the known automatic transmissions is that a large time lag is involved in 2-3 and 3-4 upshifting operations due to the necessity for the operation of three frictional engagement elements, i.e., a CO clutch, a C1 clutch and a B1 clutch. In addition, since the clutch pressure cannot be controlled freely, a large shock is generated when a speed gear change is executed through switching of engagement between clutches which do not incorporate one-way clutch or between a clutch and a brake.

It is also to be noted that a considerably long time, e.g., several seconds or so, is required for the hydraulic oil to be drained at the time of shift from D, 2 or L range to P, R or N range. Therefore, if the shift lever is operated to effect a shift back to D, 2 or L range immediately after a shift to P,R or N range, the engaging pressure is established very quickly because of the residual hydraulic pressure,so that the clutch is abruptly switched into engaging state thereby to cause a shock.

SUMMARY OF THE INVENTION

Accordingly, an object of the present invention is to provide a hydraulic pressure control device which enables the hydraulic circuit to have a simple and compact design and which enables a delicate shock control in response to all speed gear changing operations, thereby overcoming the above-described problems of the prior art.

Other objects and advantages of the invention will in part be obvious and will in part be apparent from the specification.

To these ends, according to one aspect of the present invention, there is provided a hydraulic pressure control device of an automatic transmission of the type having a planetary gear mechanism, a plurality of frictional engaging elements capable of selectively connecting a plurality of rotary elements of a planetary gear mechanism, a hydraulic circuit for switching and controlling the frictional engagement device, the hydraulic circuit including a regulator valve for generating a line pressure, a manual valve for selectively changing the line pressure, a plurality of speed gear changing solenoid valves for directly controlling, through independent duty ratio control, the engaging hydraulic pressures acting on respective frictional engagement elements, and a plurality of relay valves controlled by the solenoid valves, the hydraulic pressure control device comprising: a shift lever position switch for detecting in which one of D, 2, L, P, R and N ranges the shift lever is set; a shift time detection means for detecting, in response to the signal from the shift lever position switch, the time from the moment of shift from D, 2 or L range to P, R or N range till the moment of shift back to D, 2 or L range from the P, R or N range; and correction means for correcting the duty data concerning the duty ratio of current supplied to the solenoid valve at the time of shifting from P, R or N range to the D, 2 or L range in accordance with the signal from the shift time detection means.

According to another aspect of the present invention, there is provided a hydraulic pressure control device of an automatic transmission of the type having a planetary gear mechanism, a plurality of frictional engaging elements capable of selectively connecting a plurality of rotary elements of a planetary gear mechanism, a hydraulic circuit for switching and controlling the frictional engagement device, the hydraulic circuit including a regulator valve for generating a line pressure, a manual valve for selectively changing the line pressure, a plurality of speed gear changing solenoid valves for directly controlling, through independent duty ratio control, the engaging hydraulic pressures acting on respective frictional engagement elements, and a plurality of relay valves controlled by the solenoid valves, the hydraulic pressure control device comprising: an ignition switch capable of detecting starting f an engine to which the automatic transmission is connected; and correction means for correcting the duty data concerning duty ratio of current supplied to the solenoid valve when a shift is done for the first time after the start of the engine from P, R or N range to D, 2 or L range.

According to the invention, as shown in FIG. 15(a) showing the characteristic as obtained when a shift is done from D, 2 or L range to P,R or N range and then back to D, 2 or L range, the duty ratio during the shift from N to D range is first maintained at 0% for a predetermined period of time so as to provide a sufficiently large apply flow rate and is progressively increased, the duty ratio being then progressively reduced towards 0%. In this case, the time T till the N to D shift is 10 seconds so that the amount t of time shortening is 0, as shown in FIG. 14.

FIG. 15(b) shows the case where the time T till next shift is 6 seconds so that the amount of time shortening is $t_4$ seconds as shown in FIG. 14. Therefore, the length of time throughout which the duty ratio is maintained at 0% during the N to D shift is shortened by an amount $t_4$ second.

In consequence, any drastic action of the hydraulic pressure on the clutch is avoided to minimize the shock, even when the shift lever is operated from P, R or N range back again to D, 2 or L range immediately after a shift from D, 2 or L range to P, R or N range.

FIG. 16 shows the routine which is performed in Step 208 for the purpose of duty data correction when the present N→D shift is the first occurrence after the start of the engine.

In another aspect of the present invention, the duty data is corrected so as to increase initial rates of supply of the hydraulic oil to the oil passages and pistons of clutches when an N→D shift instruction is given after turning on of the ignition switch. Namely, as shown in FIG. 17, the predetermined time throughout which the duty ratio is maintained at 0% is prolonged for $a$ seconds during the first N→D shift after the start of the engine, as shown in FIG. 17. Therefore, a sufficiently large amount of hydraulic oil is held in the hydraulic circuit even when an N→D shift is done for the first time after starting of the engine, though the hydraulic oil has been discharged from the hydraulic circuit when the engine was stopped. It is therefore possible to avoid any shock which may otherwise be caused due to shortage of the hydraulic oil immediately after the starting of the engine.

The present invention also offers the following advantageous effects:

(a) Since only one accumulator is used, and since the number of the valves is decreased, it is possible to realize a compact valve body which is suited to use on small-sized transmissions for small-sized automobiles. In addition, it becomes easy to design small-sized automatic transmission having a multiplicity of speed stages.

(b) It becomes possible to conduct a delicate shock control over all speed gear changing operations.

(c) Shock can satisfactorily be absorbed even when the speed gear changing operation is done by switching between clutches having no one-way clutch or between a clutch and a brake.

(d) Shock tuning is possible by using a computer software to make the automatic transmission adaptable to a variety of types of engines without requiring modification of construction of the transmission.

(e) Orifice valve mechanism is eliminated and a single solenoid can conduct both the control of the line pressure and the lock-up control. so that the size of the transmission can be reduced advantageously.

BRIEF DESCRIPTION OF THE DRAWINGS

FIG. 3 is an illustration of operation of the hydraulic pressure control device and the automatic transmission shown in FIGS. 1 and 2;

FIG. 8 is an illustration of the hydraulic circuit illustrative of the operation of the hydraulic circuit performed when 3rd speed gear is selected with the shift lever set for D range;

FIG. 10 is an illustration of the hydraulic circuit illustrative of the operation of the hydraulic circuit performed when 4th speed gear is selected with the shift lever set for D range;

DESCRIPTION OF THE PREFERRED EMBODIMENTS

Preferred embodiments of the present invention will be described with reference to the accompanying drawings.

Figure 2:
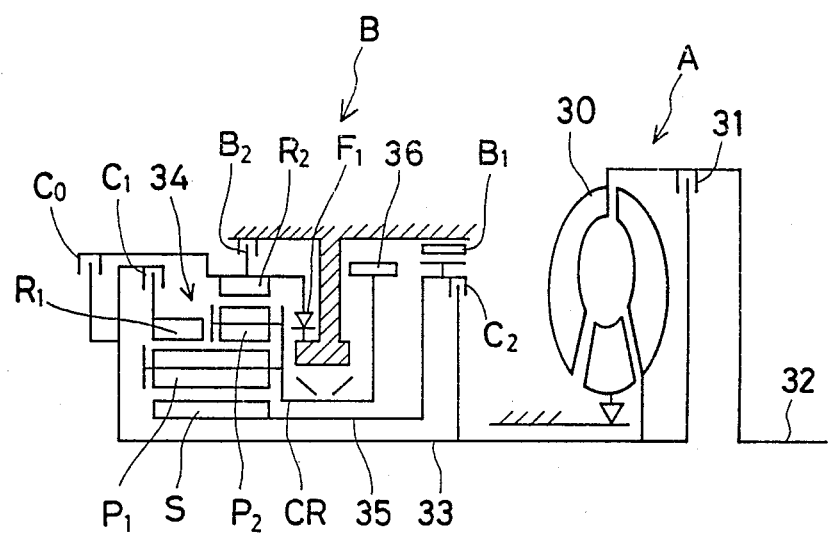
FIG. 2 is an illustration of an automatic transmission to which the present invention is applied.

The description will be first given of an automatic transmission to which the present invention is applied, with specific reference to FIG. 2.

The automatic transmission has a torque converter section A which includes a torque converter 30 and a lock-up clutch 31. The function of the torque converter section A is to transmit the engine torque from the crankshaft 32 of the engine to an input shaft 33 of an automatic transmission mechanism section B through hydraulic fluid in the torque converter 30 and through the mechanical connection provided by the lock-up clutch 31.

The automatic transmission mechanism section B has a second clutch C2, a first brake B1, a planetary gear unit 34, a first clutch C1 and a third clutch C0 which are arranged about the input shaft 33 and in the mentioned order from the axial end adjacent to the engine. A hollow shaft 35 surrounds the input shaft 33 for rotation relative thereto. The planetary gear unit 34 is of a dual type which is composed of a sun gear S formed on the hollow shaft 35, a small ring gear R1 and a long pinion P1 which meshes with the sun gear S and the small ring gear R1 and which is carried by a carrier CR. The carrier CR also carries a short pinion P2 which meshes with the long pinion P1 and a large ring gear R2.

On the other hand, the second clutch C2 is interposed between the hollow shaft 35 and the input shaft 33. The first brake B1, which is constructed as a band brake, is adapted to be brought into and out of engagement with the outer peripheral surface of the second clutch C2. A counter drive gear 36 is disposed substantially at the center of the automatic transmission mechanism section B. The drive gear 36 is splined at its inner surface to the carrier CR. A one-way clutch F1 is splined between the large ring gear R2 of the planetary gear unit 34 and the drive gear 36. A clutch-type second brake B2 is interposed between the outer periphery of the large ring gear R2 and the axle housing. The first clutch C1 is interposed between the input shaft 33 and the small ring gear R1 of the planetary gear unit 34. The third clutch C0 is interposed between the input shaft 33 and the large ring gear R2 of the planetary gear unit 34.

This automatic transmission can have a reduced size because the carrier CR and the sun gear S of the planetary gear unit 34 are constructed integrally with each other. In addition, since the counter drive gear 36 is disposed substantially at the center of the automatic transmission mechanism, a reciprocatory path of power transmission is formed so as to reduce the axial size of the transmission.

The operation of this transmission will be described with reference to the operation table shown in FIG. 3.

For the driving with the 1st speed gear, the first clutch C1 is set to engaging condition so that the rotation of the input shaft 33 is transmitted to the small ring gear R1 through the first clutch C1. In this state, the large ring gear R2 is prevented by the one-way clutch F1 from rotating so that the carrier CR is rotate forwardly at a largely reduced speed while rotating the sun gear S in the reverse direction, whereby the rotation is output from the counter drive gear 36.

For the driving at the 2nd speed gear, the first clutch C1 is maintained in engaging condition and, in addition, the first brake B1 is put into effect so as to prevent the sun gear S from rotating, so that the rotation of the small ring gear R1 transmitted from the input shaft 33 causes the carrier CR to rotate in the forward direction at a reduced speed while causing the large ring gear R2 to rotate in the forward direction, whereby the 2nd gear speed is output from the counter drive gear 36.

For the driving at the 3rd sped gear, the first clutch C1 is maintained in the engaging state and, in addition, the third clutch C0 is set to engaging state. In consequence, the rotation of the input shaft 33 is transmitted to the small ring gear R1 through the clutch C1 and also to the large ring gear R2 through the clutch C0, with the result that all the elements of the planetary gear unit 34 are rotated as a unit. In consequence, the carrier CR also is rotated and this rotation is output at the same speed as the input shaft 33 from the counter drive gear 36. In the illustration of operation at the 3rd speed stage shown in FIG. 3, hydraulic pressure is supplied to the brake B1. In this state, however, the brake B1 does not operate because the pressure of the actuator of the clutch C0 is supplied to a B1 brake release mechanism as will be explained later, so that all the elements of the planetary gear are allowed to rotate as a unit.

For the driving at the 4th speed gear, the first clutch C1 is disengaged and, at the same time, the third clutch C0 and the first brake B1 are put into operation. In consequence, the rotation of the input shaft 33 is transmitted to the large ring gear R2 through the clutch C0. Since the sun gear S is stopped by the brake B1, the carrier CR rotates at high speed while causing the small ring gear R1 to idle at an increased speed. The high-speed rotation of the carrier CR is output as over-drive speed.

In the neutral (N) or parking (P) range, all the clutches and brakes are released. In the reverse range (R), the second clutch C2 and the second brake B2 are held in engaging state. In this state, the rotation of the input shaft 33 is transmitted to the sun gear S through the second clutch C2 so that the rotation of the input shaft 33 is transmitted to the sun gear S through the second clutch C2. In this state, since the large ring gear R2 is fixed by the second brake B2, the carrier CR is reversed while reversing the small gear R1, and the reverse rotation of the carrier CR is derived as output rotation from the counter drive gear 36.

When the transmission operates at 1st speed gear in the L range (coast), the one-way clutch F1 is freed and in addition to the engagement of the first clutch C1, the second brake B2 is put into effect so as to fix the large ring gear R2, whereby the state of power transmission with the 1st sped gear is maintained to provide a high engine braking effect. The state of operation with the 2nd-speed gear in this range L is the same as that performed when the D range is selected.

Figure 5:
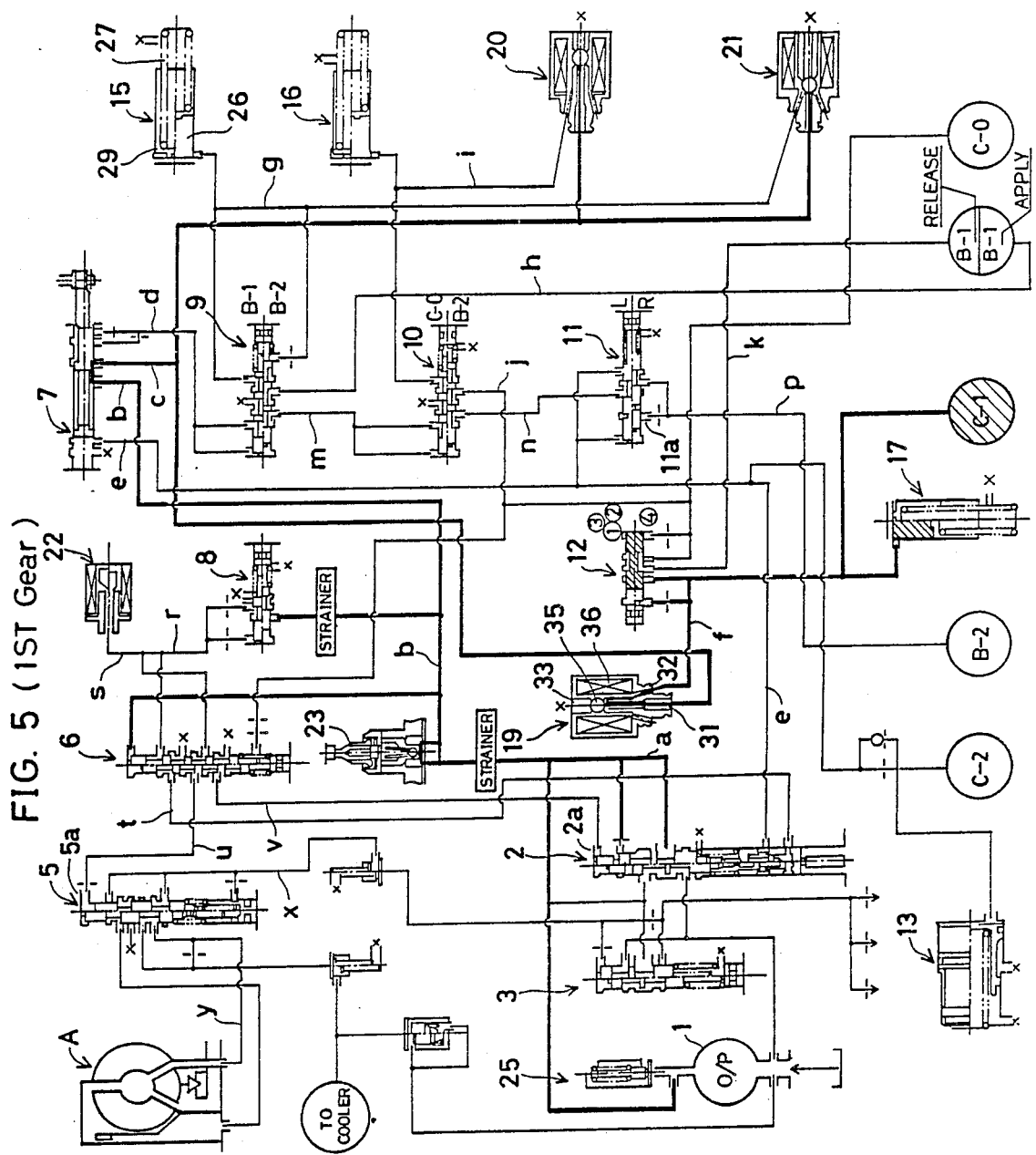
FIG. 5 is an illustration of the hydraulic circuit illustrative of the operation of the hydraulic circuit performed when 1st speed gear is selected with the shift lever set for D range.

A first embodiment of the hydraulic control device of the automatic transmission of the present invention will be described with specific reference to FIG. 5. The hydraulic pressure control device shown in FIG. 5 has the following components: an oil pump 1, a primary regulator valve 2, a secondary regulator valve 3, a lock-up control valve 5, a lock-up relay valve 6, a manual valve 7, a modulator valve 8, a B-1 relay valve 9, a C-0 relay valve 10, a low modulator valve 11, a B-1 release relay valve (speed gear changing valve) 12, a C-2 accumulator 13 for the clutch C-2, a B-1 damping valve 15 for the brake B1, a C-0 damping valve 16 for the clutch C-0, a C-1 damping valve 17 for the clutch C-1, a C-1 solenoid valve 19 for the clutch C-1, a C-0 solenoid valve 20 for the clutch C0, a B-1 solenoid valve 21 for the brake B-1, a lock-up solenoid valve 22, an oil temperature sensor 23, a pressure relief valve 25, hydraulic servos B-1, B-2, C-1, C-0 and C-2 for actuating the brakes B1, B2 and the clutches C1, C0 and C2, check valves, and orifices. In FIG. 5, numerals 1, 2, 3 and 4 represent speed stages or gears which are obtained when the spool is fixed to the upper or lower side as viewed in the drawing.

Each of the damping valves 15, 16 and 17 has a cylinder 26 and a piston 29 received in the cylinder 26 urged by a spring 27. The piston 29 is made of a plastic and, hence, has a small weight so as to exhibit a good damping responsive characteristic. In addition, the piston made of a plastic an be produced at a reduced cost.

The speed gear changing solenoid valves 19, 20 and 21 are of three-way type. Namely, each of these solenoid valves has an input port 31 to which a line pressure is led, an output port 32 and a drain port 33, and movably receives a ball 35 which selectively open and close the input port 31 and the drain port 33.

In each of the C-1 solenoid valve 19 and the C-0 solenoid valve 20, the ball 35 closes the input port 31 and opens the drain port 33 when the coil 36 is energized, whereas, when the coil 36 is not energized, the ball opens the input port 31 and closes the drain port 33. Conversely, in the B-1 solenoid valve 21, the ball 35 closes the input port 31 and opens the drain port 33 when the coil 36 is not energized, whereas,when the coil 36 is energized, the ball opens the input port 31 while closing the drain port 33.

Figure 4:
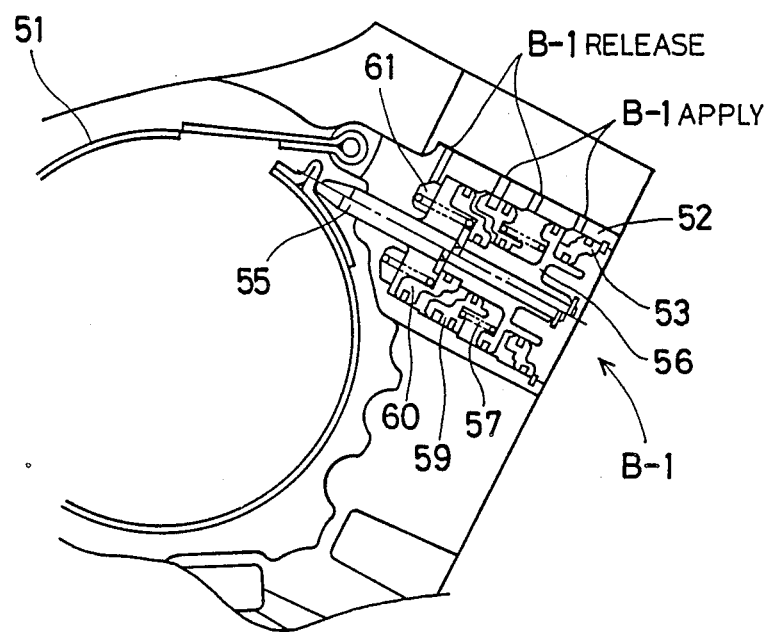
FIG. 4 is a sectional view of a brake mechanism incorporated in the hydraulic pressure control device shown in FIG. 1.

As shown in FIG. 4, the brake B1 of the type which brakes the rotation of a rotary member by means of a band brake 51. The hydraulic servo B-1 associated with the brake B1 has a fixed ring 53 fixed in the cylinder 52, a first piston 56 slidably received in the cylinder 52 and capable of causing a sliding motion of a brake rod 55, a second piston fixedly received in the cylinder 52 at the inner side of the piston 56 through a spring 57, and a third piston 60 disposed between the first piston 56 and the cylinder 52 through a spring 61.

The arrangement is such that the brake B1 is put into effect when an apply hydraulic pressure is supplied into the chamfer defined by the fixed ring 53 and the first piston 56 into the chamber defined by the second and third pistons 59 and 60. The brake B1 is released when these chambers are drained. The brake B1 is released also when a release hydraulic pressure is supplied to a chamber defined by the first and second pistons 59, 59 and the chamber formed between the piston 60 and the cylinder 52.

The operation of the described hydraulic pressure control device for automatic transmission is as follows.

The hydraulic oil boosted by an oil pump 1 is supplied to the primary regulator valve 2 through a passage a and is regulated by the primary regulator valve 2 to a predetermined line pressure. The hydraulic oil of the line pressure is supplied to the manual valve 7 through an oil passage b. The remaining portion of the hydraulic oil is supplied to a secondary regulator valve 3 so as to be regulated to a secondary pressure which is supplied to a lubricating system and also to a lock-up control valve 5.

The line pressure of the oil passage b supplied to the manual valve 7 is supplied to the respective oil passages as shown in the following table in accordance with the shift range position.

TABLE 1

|    | Oil passage c | Oil passage d | Oil passage e |
|----|---------------|---------------|---------------|
| PN | X             | X             | X             |
| D  | O             | X             | X             |
| L  | O             | O             | X             |
| R  | X             | X             | O             |

P-N Range

When the P range has been selected, none of the oil passages c, d and e receives the hydraulic pressure of the oil passage b, and the C-1 solenoid valve 19 and the C-0 solenoid valve 20 are energized while the B-1 solenoid valve 21 is not energized,whereby all the valves are switched to the drain positions.

D Range

Referring to FIG. 5, for attaining 1st speed stage in the D range, as the duty ratio of the current energizing the C-1 solenoid valve 19 is progressively decreased to deenergized state, the oil passage c is allowed to communicate with the oil passage f so that the B-1 release relay a valve 12 is switched to an illustrate state so that the hydraulic servo C-1 is supplied with hydraulic pressure, whereby the 1st speed stage is obtained. In this state, the duty ratio of the C-1 solenoid valve 19 is freely changed so that the hydraulic pressure of the oil passage f can be raised and lowered freely, thus allowing the clutch C1 to engage smoothly. At the same time, any fluctuation in the oil passage f during the duty ratio control can be reduced by virtue of the damping valve 17.

Figure 6:
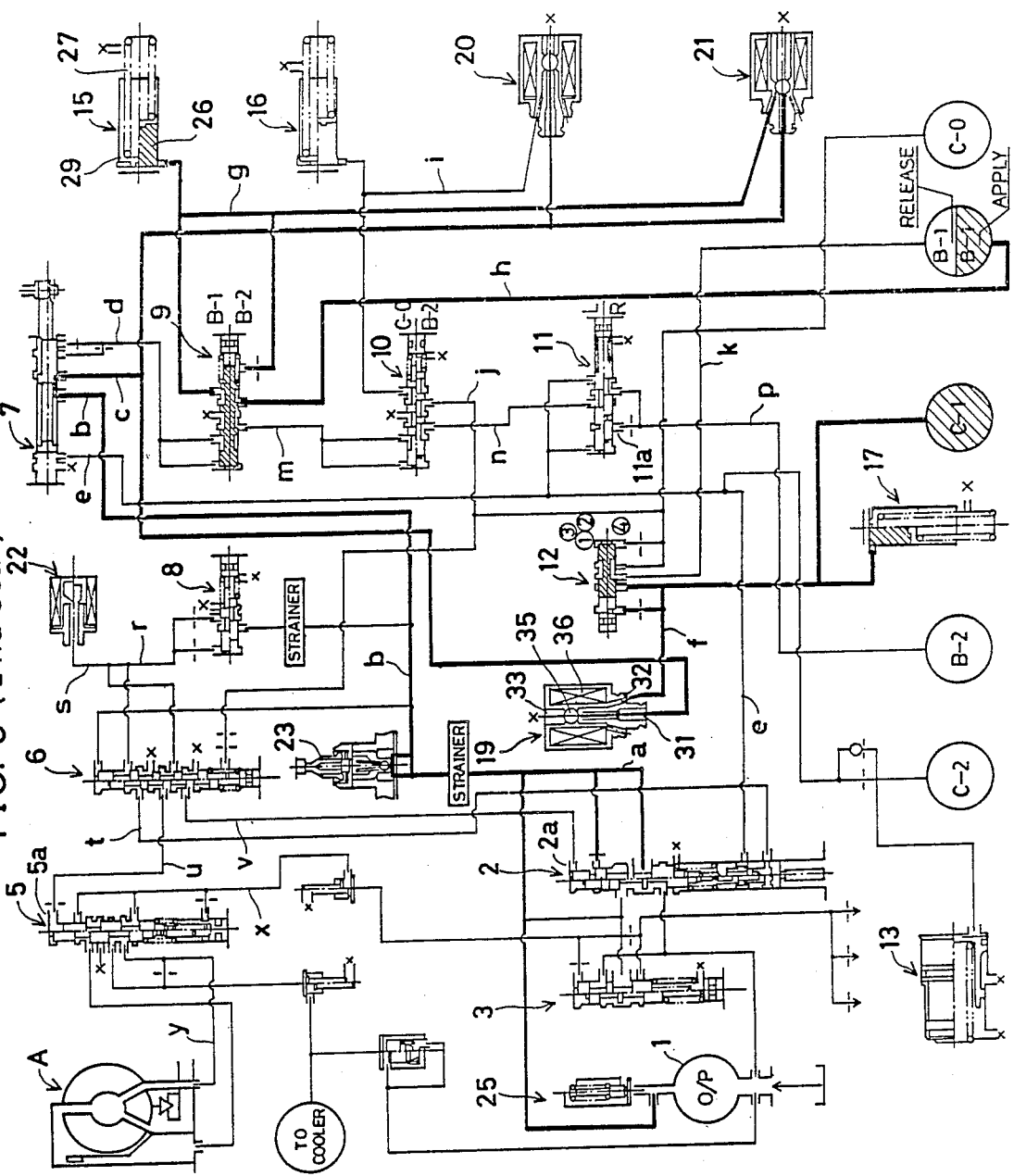
FIG. 6 is an illustration of of the hydraulic circuit illustrative of the operation of the hydraulic circuit performed when 2nd speed gear is selected with the shift lever set for D range.

Referring now to FIG. 6, when a speed gear changing instruction for upshifting to 2nd speed gear is generated, the duty ratio of the B-1 solenoid valve 21 is progressively increased from non-energized state to energized state so that the oil passage c is brought into communication with the oil passage g so that the B-1 relay valve 9 is switched to the state shown in the drawings, with the result that the oil passage g and the oil passage h are communicated with each other thereby enabling the hydraulic servo B-1 to be supplied with hydraulic pressure, whereby the 2nd speed stage is attained. In this case also, a smooth speed gear changing operation can be performed by virtue of the duty ratio control and the operation of the damping valve 15.

Figure 7:
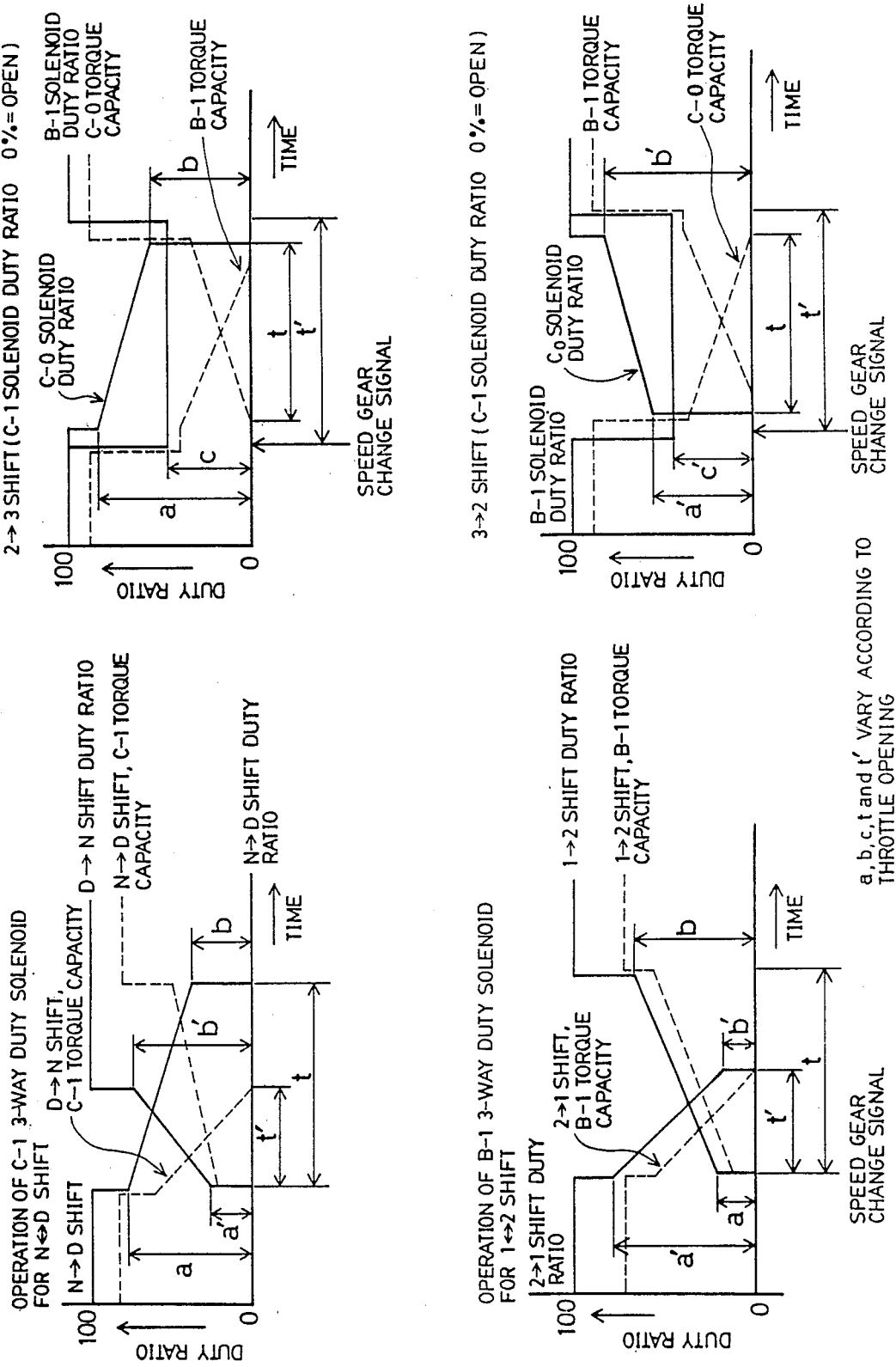
FIG. 7 is an illustration of the operation of frictional engagement elements during 2-3 upshifting.

During 2-3 upshifting, the line pressure is still maintained in the C-1 hydraulic servo. Since the line pressure is higher than the regulated pressure of the C-0 servo, the B-1 release relay valve 12 is urged to the right so that the C-0 hydraulic servo and the B-1 release hydraulic servo are connected to the same circuit. In this state, the B-1 pressure, the C-0 pressure and the B-1 release pressure are controlled as shown in FIG. 7, whereby the state of the clutch can be switched smoothly.

For the purpose of 2-3 upshifting, the B-1 apply pressure is temporarily lowered to such a level that there is almost no margin of the torque capacity of the brake B-1, in accordance with the throttle opening. In the meantime, the C-0 pressure and the B-1 release pressure are equalized through a circuit and are progressively raised. In consequence, the clutch C-0 is changed into engaging state while the B-1 servo is released by the difference between the B-1 apply pressure and the B-1 release pressure, whereby the speed gear change is conducted in a good timing. The releasing hydraulic pressure characteristic of the B-1 hydraulic servo and the engaging hydraulic pressure of the clutch C-0 can be determined in any desired pattern because the duty ratios of the respective solenoids can be controlled independently, thus minimizing a shock generated by the speed gear changing operation.

Referring now to FIG. 8, when a 3rd speed instruction is given, the duty ratio of the current for the C-0 solenoid valve 20 is progressively decreased to deenergized state so that the oil passage c is brought into communication with the oil passage is so that the C-0 relay valve 10 is switched to the illustrated state. In consequence, oil passages is and j are communicated with each other so as to allow the hydraulic servo C-1 to be supplied with hydraulic pressure. At the same time, the oil passage j is brought into communication with an oil passage k through the B-1 release relay valve 12, whereby the B-1 release hydraulic servo is supplied with the hydraulic pressure. Consequently, the brake B-1 is released at a good timing, is.e., concurrently with the engagement of the clutch C0, so that upshifting from the 2nd to 3rd speed gears is conduct smoothly.

A smooth speed gear changing operation is ensured also in this case by virtue of the duty ratio control and the operation of the damping valve 16.

When upshifting from 3rd to 4th speed gear, the line pressure is still maintained in the C-0 hydraulic servo. Since the line pressure is higher than the regulated hydraulic pressure of the C-1 hydraulic servo, the B-1 release relay valve 12 is urged to the left and the C-1 hydraulic servo and the B-1 release hydraulic servo are connected to the same circuit. In this state, as the B-1 pressure, C-1 pressure and the B-1 release pressure are controlled in a manner shown in FIG. 9, switching of states of the clutches are effected smoothly. For instance, for the purpose of the 3-4 upshifting, the B-1 apply pressure is temporarily controlled to a low pressure and, in the meantime, the C-1 pressure and the B-1 release pressure are connected through the same circuit and are progressively decreased so that the clutch C-1 is released and the B-1 hydraulic servo is brought into engaging state due to the difference between the B-1 release pressure and the B-1 apply pressure whereby the speed gear changing operation is performed in good timing.

Referring now to FIG. 10, when an instruction for upshifting to 4th sped gear is generated, the duty ratio of the current supplied to the C-1 solenoid valve 19 is progressively increased from the non-energized state to energized state, so that the hydraulic pressure in the oil passage f is drained from the drain port 33 of the C-1 solenoid valve 19. At the same time, the B-1 release hydraulic servo and the hydraulic pressure in the C-1 hydraulic servo are relieved. In consequence, the brake B1 is put into effect in a good timing, is.e., concurrently with the release of the clutch C1, whereby the upshifting from the 3rd to 4th speed is executed smoothly.

Downshifting operations are performed by reversing the above-described procedures.

L Range

During operation with 2stspeedgear in L range, the oil passage b communicates both with the oil passage c and the oil passage d, so that the B-1 relay valve 9 is switched to the lower position as viewed in FIG. 5. In consequence, the oil passage d is brought into communication with an oil passage m so that the hydraulic pressure in the oil passage m is applied to the C-0 relay valve 10 thereby to switch the same to the lower position as viewed in the figure, whereby the oil passage m is brought into communication with an oil passage n. In this state, the hydraulic pressure from the oil passage e is not applied to the low modulator a valve 11 so that the low-modulator a valve 11 is set at the raised position as viewed in the figure, whereby the oil passage n and the oil passage p are brought into communication to enable the B-2 hydraulic servo to be supplied with hydraulic pressure. thereby providing a large engine braking effect. In this state, a feedback pressure is applied to the port 11a of the low-modulator valve 11 so as to regulate the pressure in the oil passage p.

R Range

When the R range has been selected, the oil passage b communicates with the oil passage e so that the C-2 hydraulic servo is supplied with the hydraulic pressure, whereas the hydraulic pressure from the oil passage e is applied to the low-modulator valve 11 so as to switch the same to the lowered position as viewed in FIG. 5, whereby the oil passage e and the oil passage p communicate with each other to allow the B-2 hydraulic servo to be supplied with hydraulic pressure, thus realizing a reversing state of the transmission.

The hydraulic circuit described above is devoid of shift valves which are used in conventional automatic transmissions and which are switched in accordance with the respective speed gear changing operations. Therefore, valves are provided in order to prevent that some of the frictional engagement elements are simultaneously put into engaging state, thereby avoiding danger of quick stopping or spinning of the vehicle.

More specifically, the C-0 relay valve effectively prevents simultaneous engagement of the elements C-0, B-2, and C-1 or C-2. Simultaneous engagement of the elements B-1 and B-2 is avoided by the B-1 relay valve 9. The manual valve 77 effectively prevents the elements C-2, B-1 and C-1 or C-0 from being put into engaging states simultaneously. The B-1 release relay valve 12 and the B-1 release hydraulic servo cooperate with each other in preventing the elements C-0, B-1 and C-1 from being put into engagement simultaneously. The manual valve 7 also is effective in preventing the elements C-2, B-2 and C-1 from being put into engaging states simultaneously.

A description will be given of the operation performed when the electric wire of the solenoid is accidentally cut or when the power supply to the solenoid is failed.

When P or N range has been selected, the oil passage b is cut by the manual valve 7 so that the transmission is switched to neutral state regardless of the state of the solenoid, is.e., irrespective of whether the solenoid is energized or not energized.

When R range has been selected, the oil passage b is brought into communication with the oil passage e so that hydraulic pressure is applied to the C-2 hydraulic servo and the B-2 hydraulic servo, thereby establishing the reversing condition of the automatic transmission.

When the D or 2nd range has been selected, the oil passage b is communicated with the oil passage c so that hydraulic pressure is supplied to the C-1 solenoid valve 19, C-0 solenoid valve 20 and the B-1 solenoid valve 21.

When the wire of the solenoid is cut, hydraulic pressure is delivered by the C-1 solenoid valve 19 and the C-0 solenoid valve 20 in non-energized state, while the B-1 solenoid a valve 21 supplies the hydraulic pressure when energized, thus realizing the 3rd speed stage.

When the L range has been selected, the oil passage b is communicated with the oil passages c and d so that the C-1 solenoid valve 19 and the C-0 solenoid valve 20 open the oil passages as in the case of the D range, tending to supply the hydraulic pressure to the C-1 hydraulic servo and the C-0 hydraulic servo. In this case, however, sine the hydraulic pressure of the oil passage d acts to urge the C-) relay valve to the right, the oil passages is and j through which the C-0 hydraulic pressure is supplied are blocked. Consequently, B-2 hydraulic servo is supplied with the hydraulic pressure through the oil passages d, m, n and p, whereby the clutch C-1 and the brake B-2 are put into engaging states t form the 1st speed stage.

It is thus possible to obtain the neutral, forward 1st speed, forward 3rd speed and reversing states by suitably shifting the manual valve even in the vent of cutting of the wire in the solenoid.

A description will be given hereinafter as to the line pressure control and the control of the lock-up clutch in the above-described hydraulic circuit.

As the engine is started, the oil pump 1 also starts to operate by the power of the engine so that the line pressure is generated in the oil passage -b by the operation of the primary regulator valve 2. In consequence, hydraulic pressure is applied to the upper port of a lock-up relay valve 6 so as to press the same downward, is.e., to the left as viewed in FIG. 5. This state is obtained when the transmission is in a state other than 3rd speed state and 4thspeed state in the D range. In this state, an oil passage r and the oil passage s are communicated with the oil passages s and the oil passage v, respectively. When the duty ratio of the current supplied to the lock-up solenoid 22 is changed in accordance with the throttle opening, hydraulic pressure is supplied to the port 2a of the primary regulator valve 2 so that the line pressure is changed until a balance of pressure is obtained across the valve. When the R range has been selected, the line pressure acts also on the oil passage e so that the whole line pressure is regulated to a high level.

During operation at 3rd or 4th speed gear in the D range, the C-0 solenoid valve 20 allows the hydraulic pressure to be applied to the lower port of the lock-up relay valve 6 through the oil passage j, with the result that the lock-up relay valve 6 is shifted upward, i.e., to the right as viewed in FIG. 5, whereby the oil passage r is blocked to enable the oil passage s and the oil passage u to communicate with each other, while an oil passage v is allowed to be drained. In this state,the duty ratio of the current supplied to the lock-up solenoid valve 22 is changed in accordance with the throttle opening so that the hydraulic pressure in the control port 5a of the lock-up control valve 5 is changed to cause a change in the secondary pressure which is directed from an oil passage x to an oil passage y, whereby an on-off control of the lock-up clutch and the slip control are performed. In this case, since the oil passages t and v are drained, the line pressure is regulated to a constant low pressure.

Figure 11:
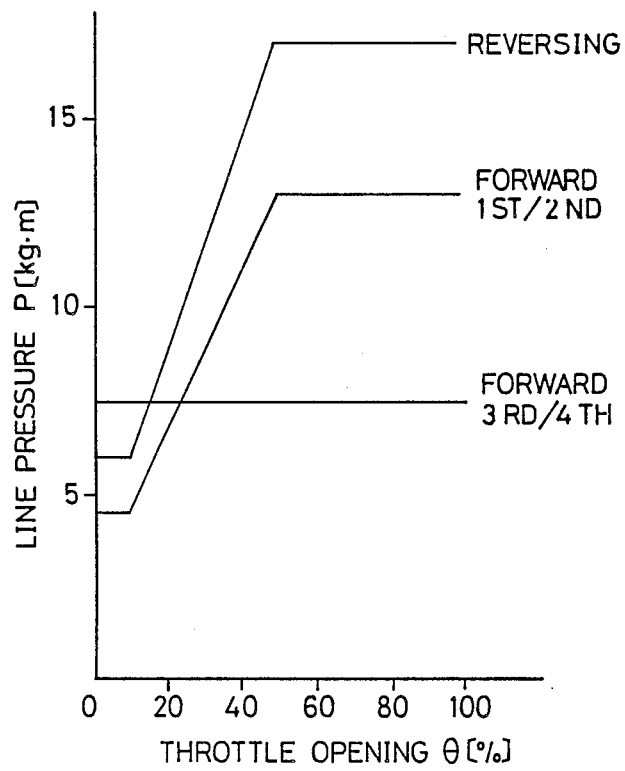
FIG. 11 is an illustration of the line pressure characteristic.

FIG. 11 shows the line pressure regulating operation described above. When 1st or 2nd speed gears are used, the lock-up clutch is not controlled because the lock-up clutch does not produce any remarkable effect when the transmission is operating at such low-speed gears. When the 1stor the 2nd sped gear is used, there is a possibility of stall start-off of the automobile, so that a high line pressure is required when the throttle opening is large. To comply with such a demand, the line pressure is controlled by the lock-up solenoid valve. Conversely, when 3rd or 4thspeed gear is used, the lock-up clutch produces a substantial effect while the line pressure does not need to be high. In this case,therefore, the lock-up control is executed and the line pressure is maintained at a predetermined low level.

A description will be given of the hydraulic pressure control device of the invention for use in the above-described automatic transmission.

Figure 1:
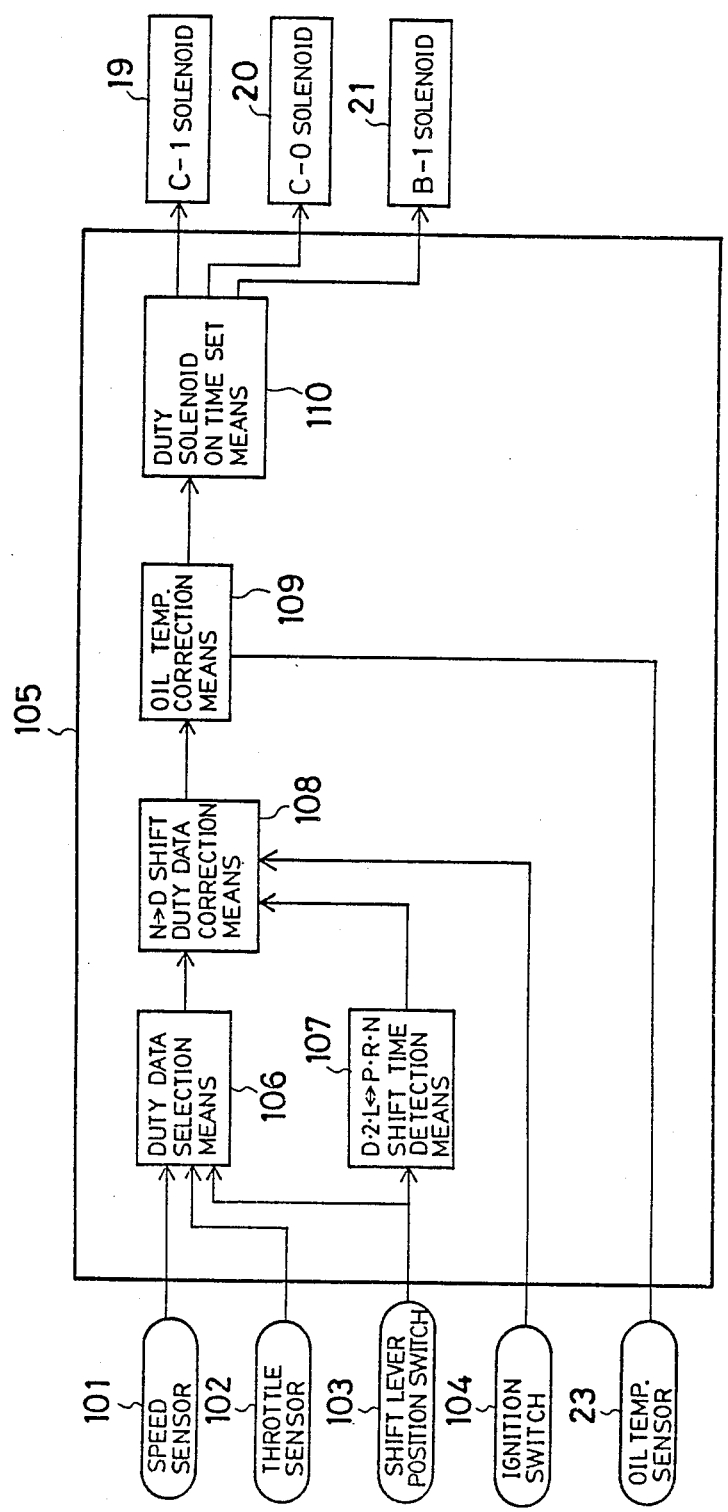
FIG. 1 is a block diagram of an embodiment of a hydraulic pressure control device of the invention for use in an automotive automatic transmission.
Figure 9A:
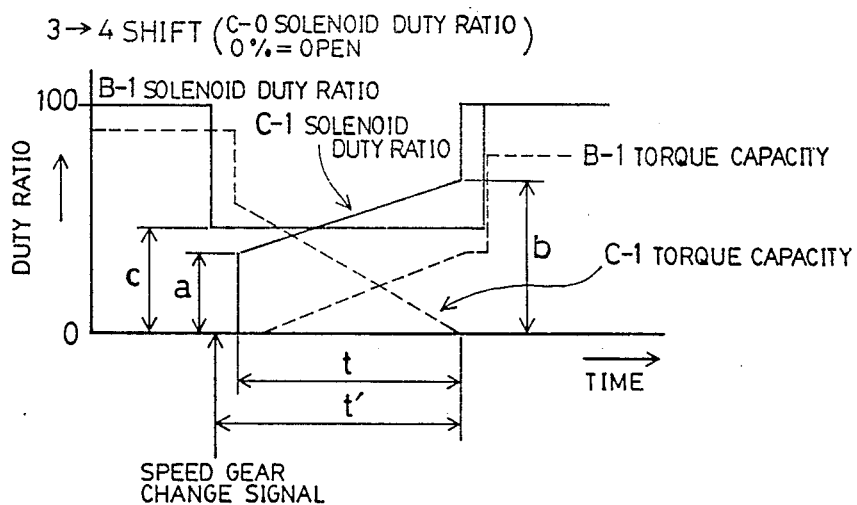
FIG. 9 is an illustration of the operation of frictional engagement elements during 2-3 upshifting.
Figure 9B:
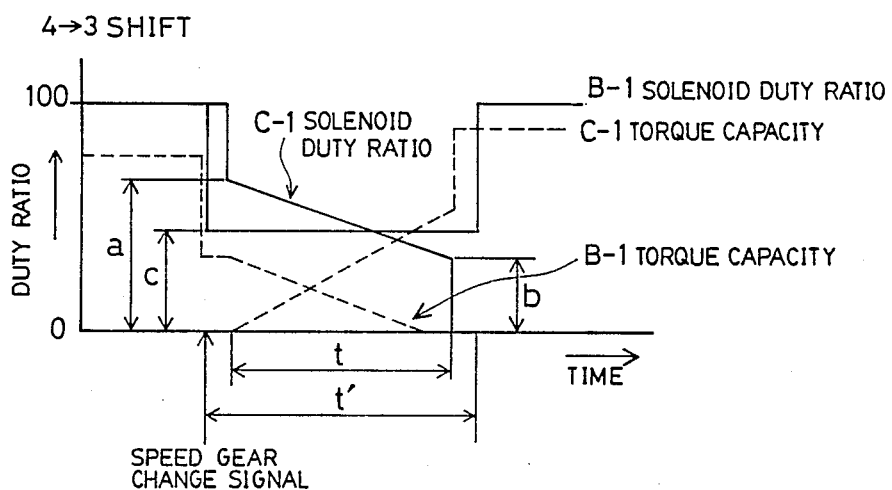

FIG. 1 shows a control circuit of the hydraulic pressure control device of the present invention. Detection signals from a speed sensor 101, a throttle sensor 102 and a shift lever position switch 103 for detecting the shift range are input to a duty data selection means 106 of an electronic control unit 105, so that duty data representing the relationship between the time and the duty ratio is selected in accordance with the pattern of N-D shift and the pattern of change of speed gear from one to another of 1s to 4th speed gears and the throttle opening as shown in FIGS. 7 and 9.

The control circuit also includes a timer 107 which detects, in response to the detection signal derived from the shift lever position switch 103, the elapsed shift time during shifting from one of D, 2 and L ranges to one of P, R and N ranges. In response to the output signal of the timer 107 and a detection signal derived from an ignition switch 104, an N→D shift duty data correction means 108 conducts correction of the duty data. A further correction of the duty data is performed by an oil temperature correction means 109 in accordance with a signal derived from an oil temperature sensor 23. Then, duty ratio is computed by 110 on the basis of the corrected duty data and the on-time of the duty solenoid is set in accordance with the result of the computation and speed gear changing signals are delivered to the C-1 solenoid 19, C-0 solenoid 20 and the B -1 solenoid 21.

A description will be given of the content of the control process performed in the present invention, with specific reference to FIGS. 12, 13 and 14.

Figure 12:
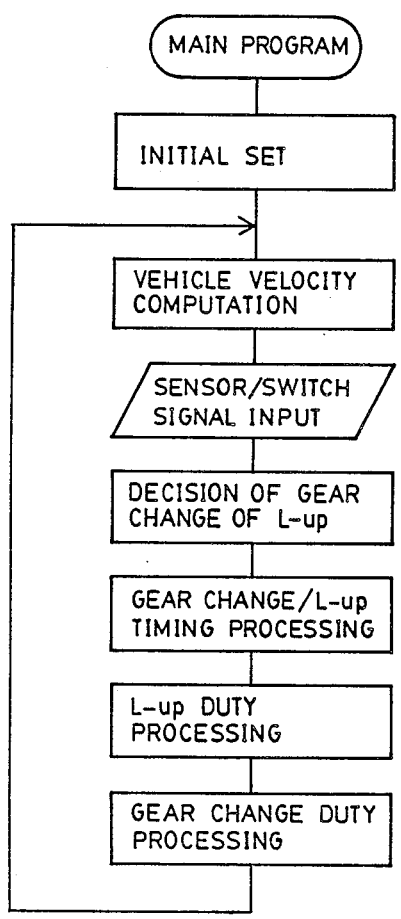
FIG. 12 is a main flow chart of a process performed by the control system in the present invention.

FIG. 12 illustrates a main flow. After the initial setting, various processes such as vehicle velocity computing process, sensor/switch signal input process, speed change/lock-up determination process, speed change/lock-up timing process, lock-up duty process and speed gear changing duty process are performed.

Figure 13:
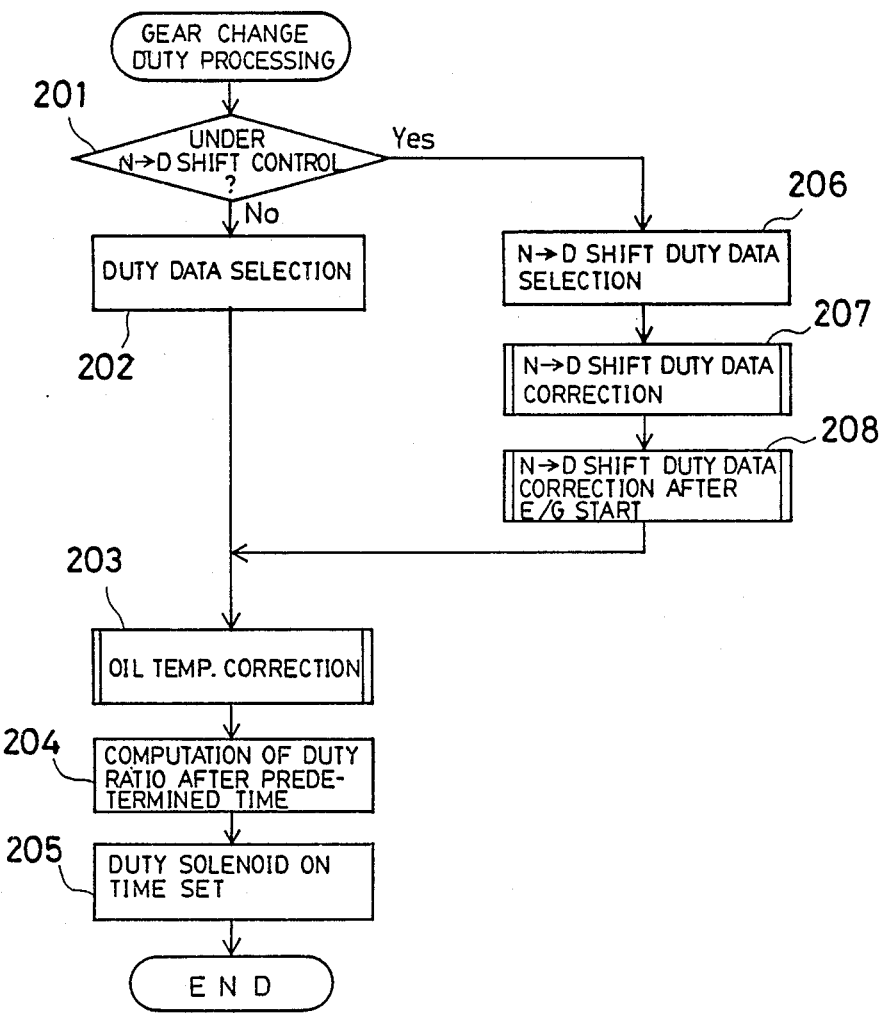
FIG. 13 is a flow chart illustrative of the speed gear changing duty processing.

FIG. 13 illustrates the flow of the speed gear changing duty process. In Step 201, a judgment is executed as to whether the transmission is under N→D shift. Namely, the shift lever position is detected by the shift lever position switch 103. Upon confirming that the shift lever is in the D, 2 or L range in the instant detection cycle, as well as in the preceding detection cycle, the process proceeds to Step 202. Conversely, if the shift lever position detected in the preceding detection cycle is P, R or N while the shift lever position detected in the instant detection cycle is D, 2 or L, the process proceeds to Step 206. In Step S 202, duty data for each speed changing pattern in ordinary running state is selected. To enable this selection, a tables have been formed which contain data concerning the time and duty ratio for each of the patterns of speed gear changing from one to another of 1st to 4th speed gears and for each of the throttle opening, as shown in FIGS. 7 and 9.

In Step 206, duty data (see FIG. 7) for N→D shift is selected. In Step 207, an N→D shift duty data correction process, which is one of the critical features of the invention, is performed followed by a duty data correction process which is conducted in Step 208 when the present N→D shift is the first occurrence after the starting of the engine.

Thus, the set duty data is subjected to oil temperature correction performed in a step 203 and the duty ratio after elapse of a predetermined time is computed on the basis of the finally set duty data, whereby the on-time of the duty solenoid is set through Steps 204 and 205.

Figure 14:
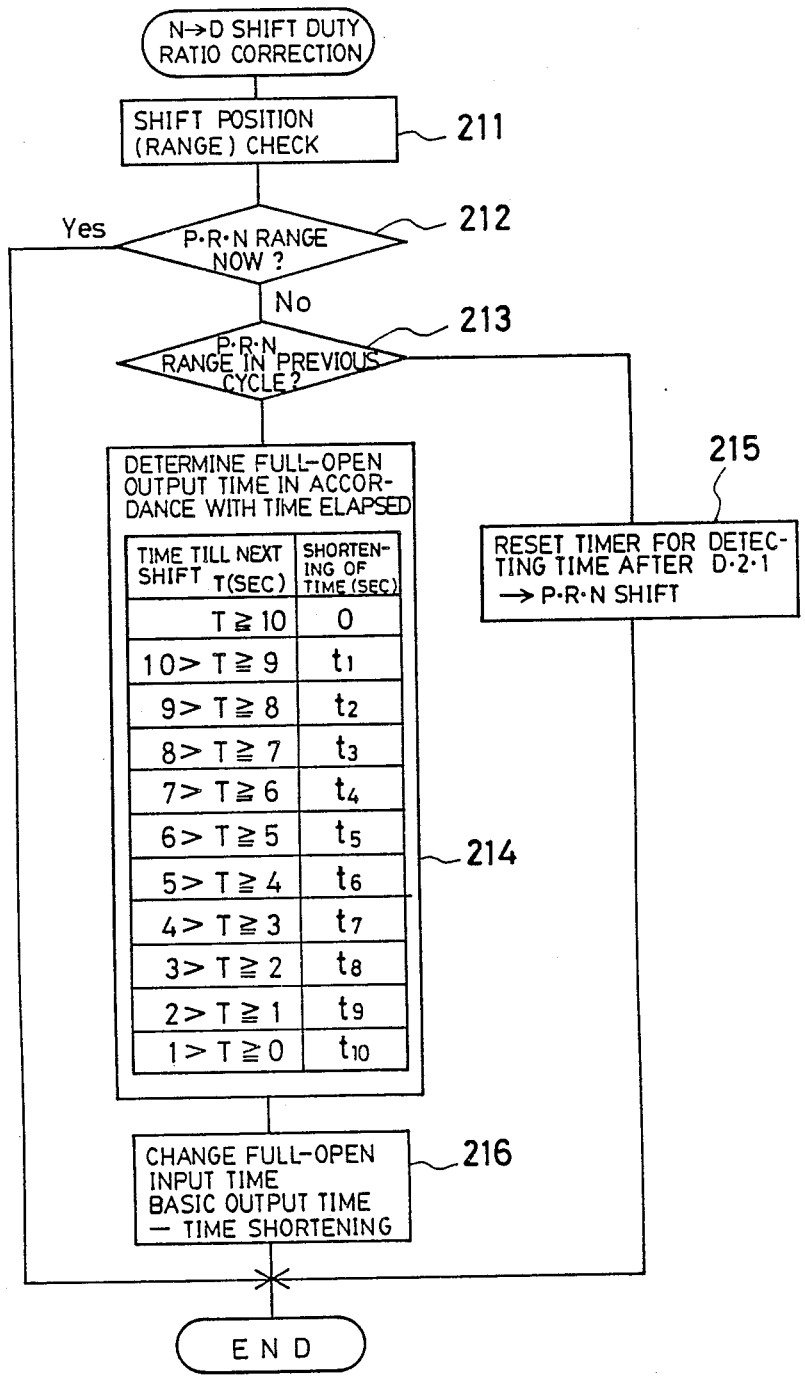
FIG. 14 is a flow chart illustrative of the N→D shift duty data correction process.

FIG. 14 illustrates the N→D shift duty data correction routine executed in Step 207. The shift position is checked in Step 211 and, in subsequent Steps 212 and 213, whether the shift positions in the preceding and instant detection cycles are one of P, R and N. If the shift position detected in the instant detection cycle is P, R or N, the process is terminated. In the shift position detected in the instant detection cycle, as well as the shift position detected in the preceding detection cycle, is D, 2 or L, the process proceeds to Step 215 in which an operation is conducted to reset a timer which detects the time elapsed after a shift from one of D, 2 and L ranges to one of P, R and N ranges.

If Steps 212 and 213 have proved that the instant shift position is D, 2 or L range while the shift position detected in the preceding detection cycle is P, R or N range, the process proceeds to Step 214 in which a computation is performed to determine the shortening t (sec) of of the duty solenoid full-open (duty ratio 0%) output time, on the basis of the time T (sec) from the moment of shift from D, 2 or L range to P, R or N range till the moment of shift from P, R or N to D, 2 or L. This time T will be referred to as "time till next shift". This determination is conducted upon consultation with a table which shows the amount of time shortening 0 to $t_{10}$ for a variety of the time T till next shift. Then, in Step 216, the amount t of time shortening is subtracted from the basic output time so as to change the full-open output time of the duty solenoid.

Figure 15:
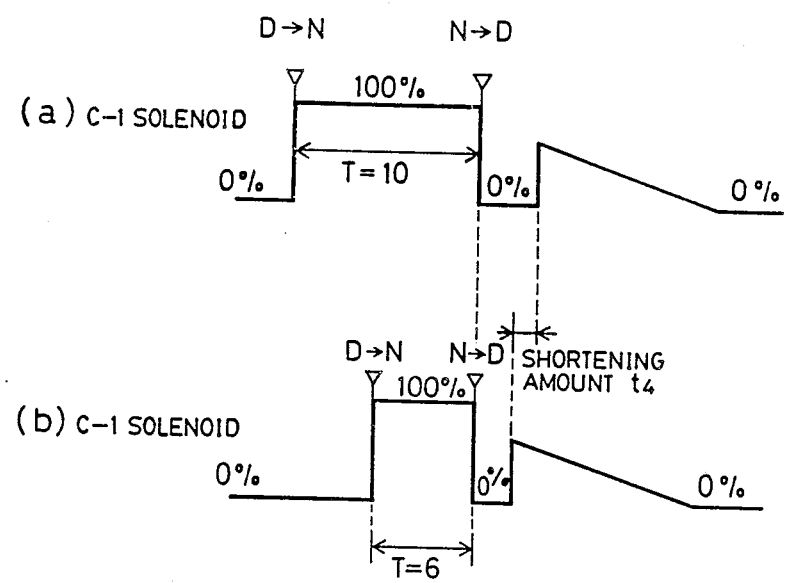
FIG. 15 is an illustration of the operation performed when duty data is corrected.

FIGS. 15(a) and 15(b) illustrate operations performed when the duty data is corrected.

More specifically, FIG. 15(a) shows the relationship between the duty ratio and time as obtained when a shift is done from D, 2 or L range to P,R or N range and then back to D, 2 or L range. During shifting from N to D, the duty ratio is first maintained at 0% for a predetermined period of time so as to provide a sufficiently large apply flow rate and is progressively increased. The duty ratio is then progressively reduced to 0%. In this case, the time T till next shift is 10 seconds so that the amount t of time shortening is 0, as shown in FIG. 14.

FIG. 15(b) shows the case where the time T till next shift is 6 seconds so that the amount of time shortening is $t^4$ seconds as shown in FIG. 14. Therefore, the length of time throughout which the duty ratio is maintained at 0% during the N→D shift is shortened by an amount $t_4$ second. In consequence, any drastic rise of the hydraulic pressure is avoided so as to minimize the shock.

Figure 16:
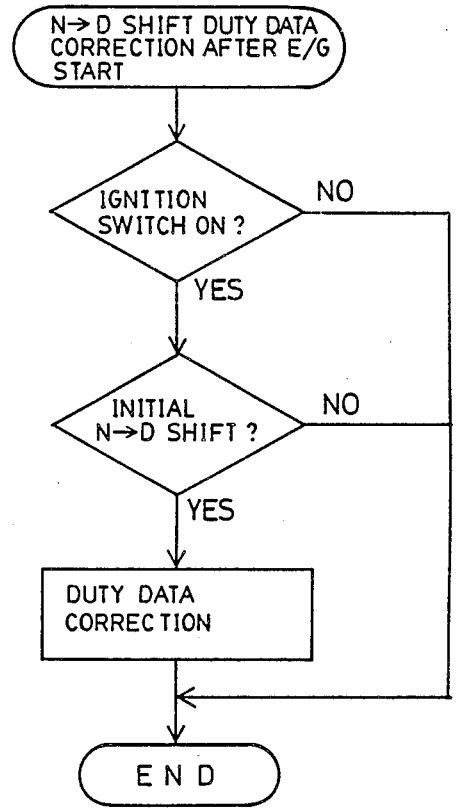
FIG. 16 is a flow chart showing an N→D shift duty data correct process after starting of the engine.

FIG. 16 shows the routine which is performed in Step 208 for the purpose of duty data correction when the present N→D shift is the first occurrence after the start of the engine.

Figure 17:
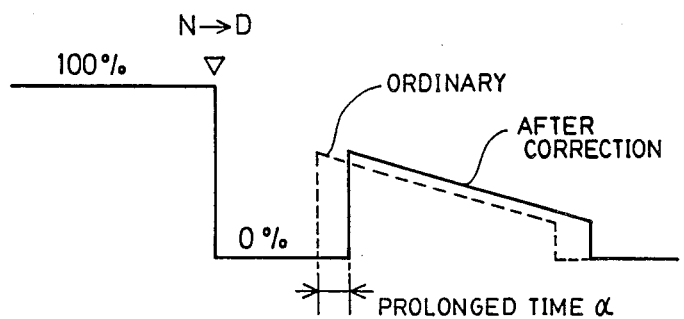
FIG. 17 is an illustration of the effect of the N→D shift duty data correction.

The hydraulic pressure in the hydraulic circuit is reduced to zero because the circuit is drained, when the engine is stopped. Therefore, ordinary solenoid control for the first N→D shift after the start of the engine involves a risk that a large shock may be generated by collision of mechanical parts of the transmission as a result of incomplete speed gear changing operation attributable to shortage of the hydraulic oil. To avoid such a problem, the duty data is corrected so as to increase initial rates of supply of the hydraulic oil to the oil passages and pistons of clutches when an N→D shift instruction is given after turning on of the ignition switch. Namely, as shown in FIG. 17, the predetermined time throughout which the duty ratio is maintained at 0% is prolonged for a seconds during the first N→D shift after the start of the engine, as shown in FIG. 17.

Figure 18:
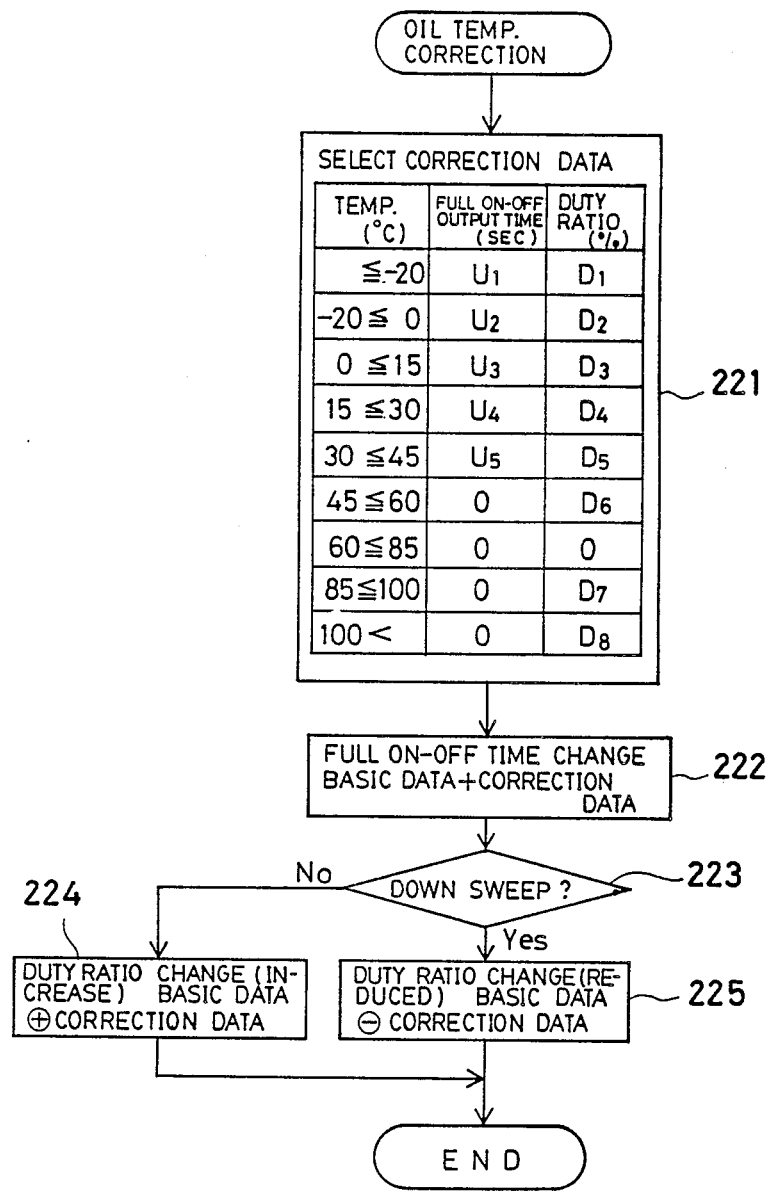
FIG. 18 is a flow chart of an oil temperature correction process.

FIG. 18 shows a routine for correcting oil temperature performed in Step 203 of the process shown in FIG. 18.

The temperature of the working oil during normal operation of an automatic transmission generally ranges between 60 and 85° C. A reduction in the oil temperature causes the viscosity of the oil to increase, resulting in a reduced fluidity of the oil. Conversely, a too high oil temperature may cause a change in the operation characteristic of solenoid valves. It is therefore necessary to effect a correction to eliminate any undesirable effect of a change in the oil temperature.

Figure 19A:
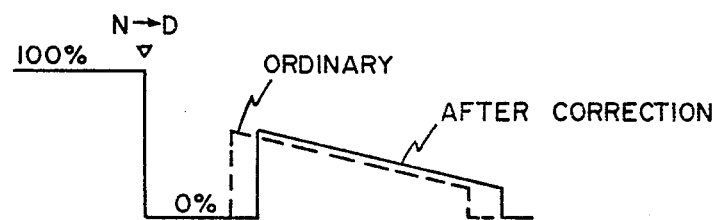
FIG. 19 is an illustration of the effect of the oil temperature correction process.
Figure 19B:
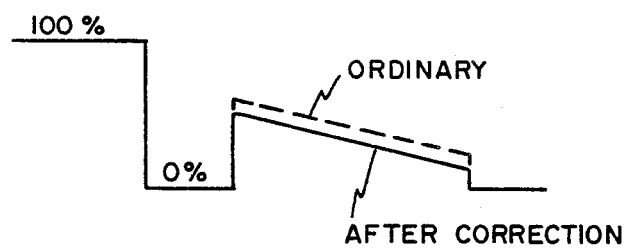

Step 211 selects a correction data concerning the relationship between the solenoid output time and the duty ratio for a variety of values of the oil temperature. Then, in Step 222, the full-on (or off) time of the solenoid is determined on the basis of the correction data as shown in FIG. 19(a).

Subsequently, in Step 223, whether the present operation is a down sweep or not is determined. As explained before in connection with FIG. 7, shifting to the first speed gear is effected by bringing the clutch C1 into engaging state through a down-sweep control of the C-1 solenoid. For upshifting to the second sped gear, the B-1 solenoid is controlled in up-sweep manner so as to allow the B-1 clutch to engage.

If the present control is determined to be down-sweep in Step 223, the process proceeds to Step 225 in which an operation is conducted so as to reduce the duty ratio on the basis of the correction data selected in Step 221. Conversely, if the present control is determined to be an up-sweep in Step 221, a correction is conducted so as to increase the duty ratio. The above-mentioned correction may be conducted by varying either one of the solenoid output time and the duty ratio.

Although the invention has been described through a specific embodiment, it is to be understood that the described embodiment is only illustrative and various changes and modifications may be imparted thereto without departing from the scope of the invention.

For instance, the invention can be applied to 3-speed or 5-speed transmissions, although a 4-speed automatic transmission has been specifically mentioned.

What is claimed is:

1. A hydraulic pressure control device of an automatic transmission of the type having a planetary gear mechanism, a plurality of frictional engaging elements capable of selectively connecting a plurality of rotary elements of a planetary gear mechanism, a hydraulic circuit for switching and controlling said frictional engagement device, said hydraulic circuit including a regulator valve for generating a line pressure, a manual valve for selectively changing said line pressure, a plurality of speed gear changing solenoid valves for directly controlling, through independent duty ratio control, the engaging hydraulic pressures acting on respective frictional engagement elements, and a plurality of relay valves controlled by said solenoid valves, said hydraulic pressure control device comprising: a shift lever position switch for detecting in which one of D, 2, L, P, R and N ranges the shift lever is set; a shift time detection means for detecting, in response to the signal from said shift lever position switch, the time from the moment of shift from D, 2 or L range to P, R or N range till the moment of shift back to D, 2 or L range from said P, R or N range; and correction means for correcting the duty data concerning the duty ratio of current supplied to said solenoid valve at the time of shifting from P, R or N rang to said D, 2 or L range in accordance with the signal from said shift time detection means.

2. A hydraulic pressure control device for an automatic transmission according to claim 1, wherein the correction of said duty data is effected such that the duty ratio is maintained at 0% for a predetermined time so as to provide a sufficiently large apply flow rate of hydraulic oil and then the duty ratio is increased followed by a progressive decrease towards 0%.

3. A hydraulic pressure control device of an automatic transmission of the type having a planetary gear mechanism, a plurality of frictional engaging elements capable of selectively connecting a plurality of rotary elements of a planetary gear mechanism, a hydraulic circuit for switching and controlling said frictional engagement device, said hydraulic circuit including a regulator valve for generating a line pressure, a manual valve for selectively changing said line pressure, a plurality of speed gear changing solenoid valves for directly controlling, through independent duty ratio control, the engaging hydraulic pressures acting on respective frictional engagement elements, and a plurality of relay valves controlled by said solenoid valves, said hydraulic pressure control device comprising: a ignition switch capable of detecting starting f a engine to which said automatic transmission is connected; and correction means for correcting the duty data concerning duty ratio of current supplied to said solenoid valve when a shift is done for the first time after the start of said engine from P, R or N range to D, 2 or L range.

4. A hydraulic pressure control device for an automatic transmission according to claim 1, wherein the correction of said duty data is effected such that the duty ratio is maintained at 0% for a predetermined time so as to provide a sufficiently large apply flow rate of hydraulic oil and then the duty ratio is increased followed by a progressive decrease towards 0%.

* * * * *

UNITED STATES PATENT AND TRADEMARK OFFICE
CERTIFICATE OF CORRECTION

PATENT NO. : 4,982,622

DATED : January 8, 1991

INVENTOR(S) : YAMAMOTO et al

It is certified that error appears in the above-identified patent and that said Letters Patent is hereby corrected as shown below:

Col. 4, line 64, "correct" should read --correction--.

Col. 6, line 12, "sped" should read --speed--; and line 56, "sped" should read --speed--.

Col. 7, line 20, "an" should read --can--; and line 49, "chamfer" should read --chamber--.

Col. 8, line 7, "PN" should read --P•N--.

Col. 9, line 24, "is.e.," should read --i.e.--;

line 51, "sped" should read --speed--;

line 59, "is.e.," should read --i.e.--; and line 66, "2stspeedgear" should read --2nd speed gear--.

Col. 10, line 58, "is.e.," should read --i.e.--.

Col. 11, line 12, "sine" should read --since--; and line 19, "t" should read --to--.

Col. 12, line 3, "sped" should read --speed--; "1stor" should read --1st or--.

line 25, "1s" should read --1st--; and line 66, delete "a".

Col. 13, line 33, delete "of" second instance.

UNITED STATES PATENT AND TRADEMARK OFFICE
CERTIFICATE OF CORRECTION

PATENT NO. : 4,982,622

DATED : January 8, 1991

INVENTOR(S) : YAMAMOTO et al

PAGE 2 of 2

It is certified that error appears in the above-identified patent and that said Letters Patent is hereby corrected as shown below:

Col. 14, line 39, "sped" should read --speed--.

Col. 15, line 17, "rang" should read --range--.

Col. 16, line 13, "a" should read --an--; and line 14, "f a " should read --an--.

Signed and Sealed this

Twenty-ninth Day of September, 1992

Attest:

DOUGLAS B. COMER

*Attesting Officer*

*Acting Commissioner of Patents and Trademarks*